(12) United States Patent
Nakamura et al.

(10) Patent No.: US 8,246,769 B2
(45) Date of Patent: Aug. 21, 2012

(54) SPEED CONTROL METHOD AND SPEED CONTROL APPARATUS FOR TRANSFER DEVICE

(75) Inventors: Takahiko Nakamura, Fuchu (JP); Toshio Yamashita, Kanazawa (JP)

(73) Assignee: Ryobi Ltd., Hiroshima-ken (JP)

( * ) Notice: Subject to any disclaimer, the term of this patent is extended or adjusted under 35 U.S.C. 154(b) by 102 days.

(21) Appl. No.: 12/726,632

(22) Filed: Mar. 18, 2010

(65) Prior Publication Data
US 2010/0236699 A1    Sep. 23, 2010

(30) Foreign Application Priority Data

Mar. 19, 2009   (JP) ................................ 2009-067867

(51) Int. Cl.
*B32B 41/00* (2006.01)
(52) U.S. Cl. .......... 156/64; 156/209; 156/219; 156/277; 156/360; 156/361; 156/362
(58) Field of Classification Search .................... 156/64, 156/209, 219, 277, 360, 361, 362
See application file for complete search history.

(56) References Cited

U.S. PATENT DOCUMENTS
6,213,016 B1    4/2001  Tsunashima
2001/0047582 A1*  12/2001  Gallagher ....................... 29/740
2006/0254445 A1*  11/2006  Masuda ....................... 101/424.1
2009/0000745 A1    1/2009  Hirokawa et al.

FOREIGN PATENT DOCUMENTS
| DE | 3149950 A1 | 7/1983 |
| DE | 60012838 T2 | 8/2005 |
| DE | 102007020226 A1 | 10/2008 |
| DE | 102008028949 A1 | 1/2009 |
| JP | 2005-138274 | 11/2006 |

* cited by examiner

*Primary Examiner* — George Koch
(74) *Attorney, Agent, or Firm* — The Webb Law Firm

(57) ABSTRACT

An object is to simplify a drive control structure of a transfer device that is designed to stop running of a film when hologram forming or surface treatment is not performed, during which the film is not required to run, and restart the film running from the running stopped state. A speed control method for controlling film running speed of a transfer device includes starting the drive of the transfer device based on a pulse signal different from a pulse signal outputted according to the rotational number of the cylinder, when the transfer film held in running stopped state is moved from the first film running path to the second film running path to run in a docking or interlocking engagement with the cylinder held in rotating state, and performing speed matching control to match the film running speed of the transfer device to the rotational speed of the cylinder; and switching a control mode from the speed matching control into synchronization control that synchronizes the rotational speed of the cylinder with the film running speed of the transfer device based on the pulse signal from the cylinder, after the matching of the speeds.

4 Claims, 4 Drawing Sheets

SPEED CONTROL METHOD AND SPEED CONTROL APPARATUS FOR TRANSFER DEVICE

CROSS REFERENCE TO RELATED APPLICATION

This application claims priority from Japanese Patent Application No. 2009-067867, which is incorporated herein by reference.

BACKGROUND OF THE INVENTION

1. Field of the Invention

The present invention relates to a technique of pressing a transfer film onto printed sheets of paper to transfer thereon gold foil, embossed patterns, hologram patterns, and the like, thereby to increase added value of the printed surfaces, and more particularly, to a speed control method and a speed control apparatus for a transfer device, which performs control of the running speed of a transfer film, which is held in running state subsequent to start from running stopped state.

2. Related Art

There is already proposed a gloss finishing apparatus for providing added value to printed sheets of paper in the above-mentioned manner. The apparatus includes a varnishing unit that applies an ultraviolet curable resin varnish (also simply referred to as "a varnish") onto the printed sheets of paper printed at a printing unit and a hologram forming unit that presses a transfer film for transferring onto the printed sheets of paper varnished at the varnishing unit. The hologram forming unit includes an impression cylinder for conveying printed sheets of paper, a pair of pressing rollers for pressing a film onto the printed sheets of paper on the impression cylinder and a UV (ultraviolet) irradiation unit for curing varnish when the film is held pressed onto the printed sheets of paper with the pressing rollers, in which the pair of pressing rollers are designed to be capable of moving upward relative to the impression cylinder into a retracted position and moving close to the impression cylinder into a pressing position, so that when hologram forming (surface treatment) is not performed, the pressing rollers are moved upward relative to the impression cylinder and positioned at the retracted position (cf. Japanese Patent Application Laid-open No. 2006-315229, FIGS. 1 and 2).

SUMMARY OF THE INVENTION

According to the gloss finishing apparatus of the aforesaid Japanese Patent Laid-open No. 2006-315229, the film running speed is controlled to be in synchronization with the rotational speed of the cylinder, and therefore, even if a pattern of the film is not transferred onto printed sheets of paper with the film kept away from the impression cylinder in the manner mentioned above, the film remains idle in synchronization with a printing press, which is not only disadvantageous in terms of endurance of the film, but also poses a problem of increasing the running costs.

In consideration of the above, it is an object of the present invention to provide a speed control method and a speed control apparatus for a transfer device that is capable of, not only stopping running of a film when hologram forming (surface treatment) is not performed during which the film is not required to run, but also simplifying a drive control structure of the transfer device for restarting the film running from the running stopped state.

According to one aspect of the present invention, there is provided a speed control method for controlling film running speed of a transfer device that includes a film running mechanism that enables a transfer film to run along both a first film running path causing the transfer film to be positioned away from a cylinder and a second film running path causing the transfer film to be positioned close to the cylinder, and a transfer section that presses the transfer film onto a printed sheet of paper transferred by the cylinder to transfer a pattern of the transfer film onto the printed sheet of paper while the film running mechanism keeps the transfer film running along the second film running path, the speed control method including:

starting the drive of the transfer device based on a pulse signal different from a pulse signal outputted according to the rotational number of the cylinder, when the transfer film held in running stopped state is moved from the first film running path to the second film running path to run in a docking or interlocking engagement with the cylinder held in rotating state, and performing speed matching control to match the film running speed of the transfer device to the rotational speed of the cylinder; and switching a control mode from the speed matching control into synchronization control that synchronizes the rotational speed of the cylinder with the film running speed of the transfer device based on the pulse signal from the cylinder, after the matching of the speeds.

By the matching of the speeds is meant herein to make the speeds substantially equal to each other.

According to another aspect of the present invention, there is provided a a speed control apparatus for controlling film running speed of a transfer device that includes a film running mechanism that enables a transfer film to run along both a first film running path causing the transfer film to be positioned away from a cylinder and a second film running path causing the transfer film to be positioned close to the cylinder, and a transfer section that presses the transfer film onto a printed sheet of paper transferred by the cylinder to transfer a pattern of the transfer film onto the printed sheet of paper while the film running mechanism keeps the transfer film running along the second film running path, the speed control apparatus including:

a running state switching means for bringing the transfer film into stopped state in the first film running path, while rotating the cylinder at a constant speed;

a rotational number detection means for outputting a pulse signal according to the rotational number of the cylinder so as to control the rotational speed of the cylinder;

a pulse signal generation means for generating a pulse signal for starting running of the transfer film held in the rotating state, when the transfer film held in the running stopped state relative to the cylinder held in the rotating state is moved from the first film running path to the second film running path to run in a docking or interlocking engagement with the cylinder held in the rotating state;

a speed matching control means for performing speed control by using a pulse signal generated by the pulse signal generation means so as to match the running speed of the transfer film, which has been started to run, to the rotational speed of the cylinder; and a synchronization control means for performing synchronization control of the rotational speed of the cylinder and the film running speed of the transfer device based on the pulse signal from the cylinder, after both the speeds have been matched to each other.

According to the above structure, bringing the transfer device into running stopped state produces an advantageous effect in terms of both the durability of a film and the running costs. Furthermore, the running speed of a film of the transfer device, which is held in running stopped state relative to the cylinder held in rotating state, can be matched to the rotational speed of the cylinder only by outputting a pulse signal different from a pulse signal from the cylinder. After the film running speed of the transfer device has been matched to the rotational speed of the cylinder, the transfer device can be synchronously controlled by a pulse signal for drivingly rotating the cylinder. In the present invention, a pulse signal generation means for generating a pulse signal for driving the transfer device may be constituted by, for example, an interface board, etc., which enables not only achieving a simplified structure as compared with the structure which controls the transfer device by a control device independently or exclusively designed in addition to the cylinder, but also accurate speed control by synchronization control after the rotational speed of the cylinder and the film running speed of the transfer device have been matched to each other.

The speed control method for controlling film running speed of the transfer device may include a step, in which the running of the transfer film is decelerated and stopped based on a pulse signal different from the pulse signal from the cylinder after or in the course of moving the transfer film from the second film running path to the first film running path, when a signal representative of finish of the drive is outputted during the transfer film is kept running in the docking or interlocking engagement.

In the speed control method for controlling film running speed of the transfer device, the running distance of the second film running path may be set to be longer than the running distance of the first film running path. With this arrangement, the method includes steps, in which the running of the transfer film is stopped while the running speed of the transfer film is kept in synchronization with the rotational speed of the cylinder, based on the pulse signal from the cylinder, when a signal representative of emergency stop is outputted during the transfer film is kept running in the docking or interlocking engagement; and the running of the transfer film is restarted and kept for a predetermined period of time and then is stopped, based on a pulse signal different from the pulse signal from the cylinder after or in the course of moving the transfer film from the second film running path to the first film running path after the stop of the running of the transfer film.

As described above, with the running distance of the second film running path set to be longer than the running distance of the first film running path, the transfer film may be loosened when the movement of the transfer film from the second film running path to the first film running path is made subsequent to the stop of the transfer device. In order to deal with this, a pulse signal different from a pulse signal from the cylinder is generated to restart the running of the transfer device and keep the running for a predetermined period of time, then stop the running, thereby enabling a loosened transfer film or a loosening transfer film to be properly wound up.

The present invention having the above structure produces advantageous effects in terms of not only the durability of a film and the running costs by bringing the transfer device into the running stopped state, but also additional advantageous effects. Specifically, the film running speed of the transfer device, which is held in running stopped state relative to the cylinder held in rotational state, can be matched to the rotational speed of the cylinder only by outputting a pulse signal different from a pulse signal from the cylinder, and the subsequent operation can be made by switching into the synchronization control. Thus, it is possible to provide a transfer apparatus and a transfer method for transferring patterns of a transfer film onto printed sheets of paper, which has such a simplified structure capable of starting the running of the transfer film held in running stopped state and matching the running speed of the transfer film to the conveying speed of the printed sheets of paper to be synchronized with each other.

BRIEF DESCRIPTION OF THE DRAWINGS

The above, and other objects, features and advantages of the present invention will become apparent from the detailed description thereof in conjunction with the accompanying drawings wherein.

DESCRIPTION OF THE PREFERRED EMBODIMENTS

Figure 1:
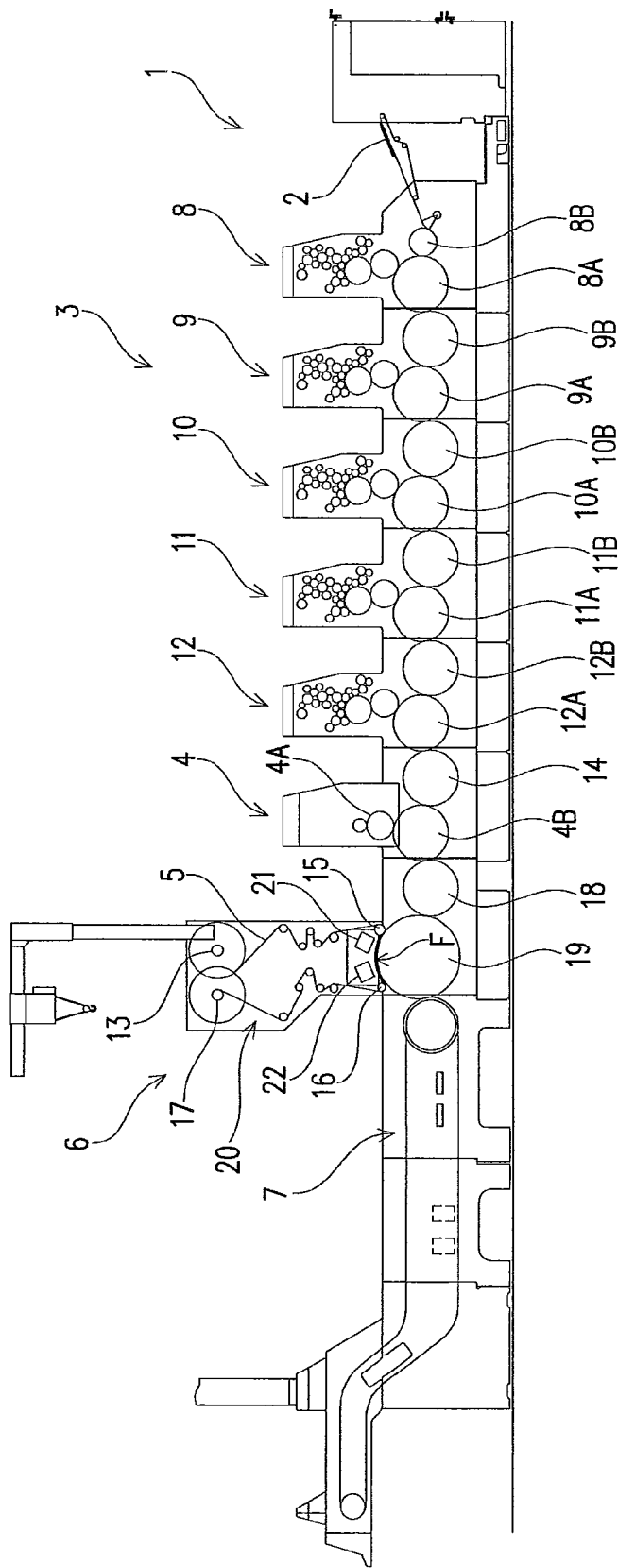
FIG. 1 is a schematic side view of a printing press.

FIG. 1 shows an example of a printing press incorporating a transfer device 6 capable of treating the printed surfaces of printed sheets of paper by varnishing and gloss-finishing the printed surfaces with a resin varnish and transferring thereon gold foil, embossed patterns, hologram patterns, and the like. This printing press includes a sheet feeder section 1, a printer section 3, a varnish applicator section 4, a transfer section F, and a sheet discharge section 7. The sheet feeder section 1 feeds sheets of paper 2 one by one or one at a time by means of a feeder device, a sheet separator device, etc., from a sheet stack table. The printer section 3 performs five-color printing on the sheets 2 fed from the sheet feeder section 1. The varnish applicator section 4 applies (coats) an ultraviolet curable resin varnish (also simply referred to as "a varnish") onto the sheets 2 that have been printed at the printer section 3. The transfer section F presses a transfer film 5 made of a stretchable material with restoring force (e.g., polyethylene terephthalate, so-called PET; other materials may also be used), onto the ultraviolet curable resin varnish over the sheets 2 that have been applied with the ultraviolet curable resin varnish at the varnish applicator section 4, thereby treating the surfaces of the sheets 2. The sheet discharge section 7 discharges the sheets 2 whose surfaces have been treated at the transfer section F. Although the printer section 3 includes five printing units 8, 9, 10, 11, and 12 so that five-color printing can be performed in the present embodiment, a printer section may be capable of printing other colors than five colors, such as a single color or more than one colors. In addition, while the sheet discharge section 7 is constructed of a chain conveyor device with grippers, the printing press may not include the sheet discharge section 7, and the specific structure of each section constituting the printing press is not limited to that shown in the figure. Also, while sheets of paper are used as printed sheets herein, a printed sheet may be a continuous elongate sheet. Further, the transfer device 6 may be built in the printing press to be used therein, whilst the transfer device 6 may not be built in the printing press to be used as a single independent unit.

In the case of attaching gold foil to the printed surfaces, a foil applicator called a foiler is used to press printed material, so that gold foil is peeled off from a substrate onto a portion with an adhesive material (or may be varnish) of the printed material attached thereto. The printed surfaces may also be applied with something other than gold foil.

The printing units 8 to 12 include, respectively, printing impression cylinders 8A to 12A as well as delivery cylinders 8B to 12B on the respective upstream sides of the printing impression cylinders 8A to 12A in a conveying direction, for delivering sheets 2 to the printing impression cylinders. Of the delivery cylinders 8B to 12B, the delivery cylinder 8B that has a small diameter and locates at the leading end in the conveying direction is also referred to as a sheet feeder cylinder, and this delivery cylinder 8B, the feeder device, sheet separator device, etc., together constitute the sheet feeder section 1. Although not shown in the figure, each of the impression cylinders 8A to 12A and the delivery cylinders 9B to 12B is provided with grippers, each having a jaw block and a gripping jaw to grip a fed sheet 2, at two positions (one gripper may be provided at a single position or more than two grippers may be provided at more than two positions) in a circumferential direction. Although not shown, the delivery cylinder 8B of a small diameter is provided with a gripper having a jaw block and a gripping jaw to grip a sheet 2, at a single position in the circumferential direction. Also, the varnish applicator section 4 includes a varnishing cylinder 4A from which the ultraviolet curable resin varnish is supplied and an impression cylinder 4B that is located opposite to the varnishing cylinder 4A to coat the ultraviolet curable resin varnish over the printed sheets 2.

A delivery cylinder 14 is provided to deliver the printed sheets 2 to the impression cylinder 4B. Although not shown, each of these cylinders 14 and 4B is also provided with grippers, each having a jaw block and a gripping jaw to grip a fed sheet 2, at two positions (one gripper may also be provided at a single position or more than two grippers may also be provided at more than two positions) in the circumferential direction, as with the above cylinders.

Figure 2:
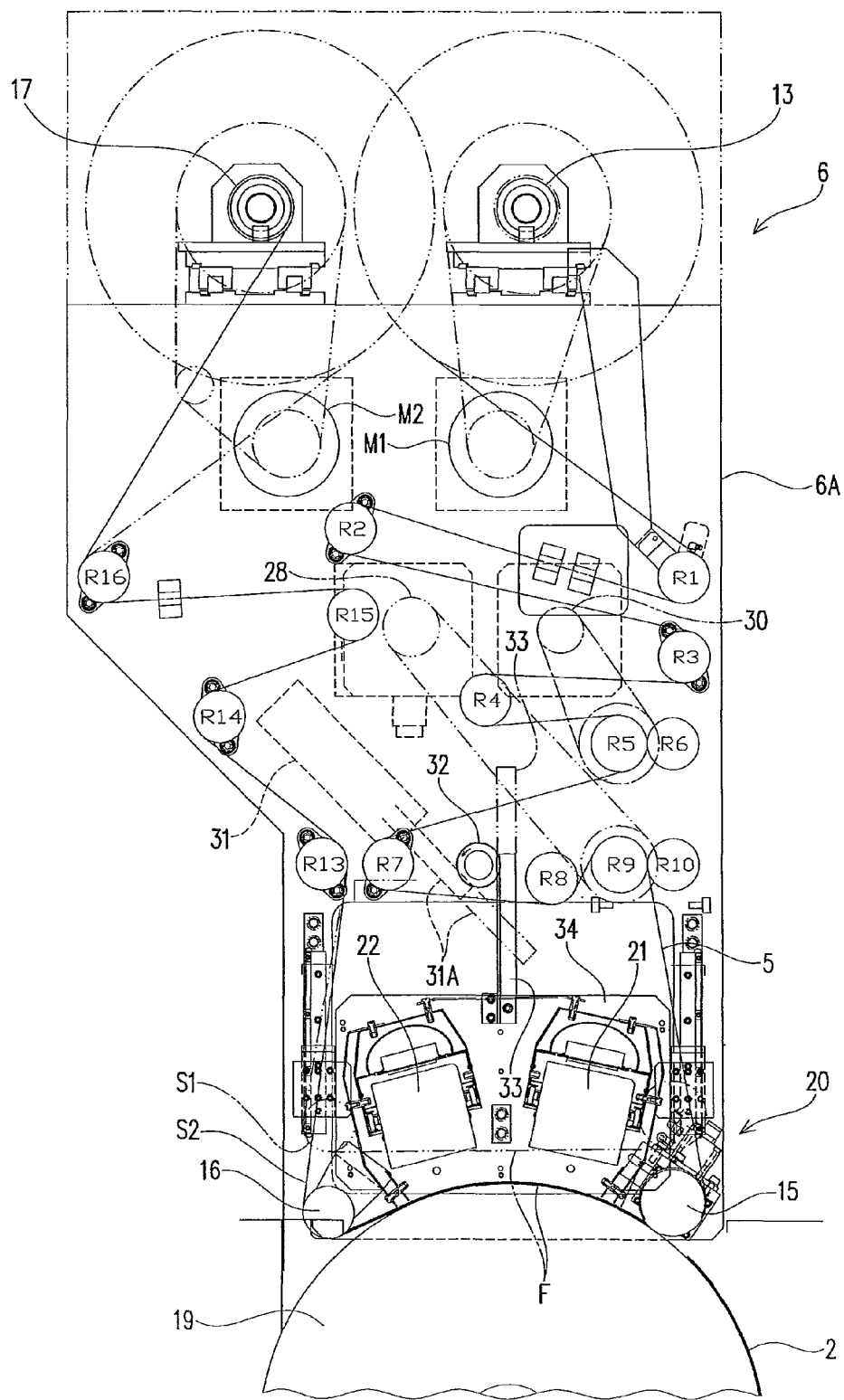
FIG. 2 is a side view of a transfer section.

As shown in FIGS. 1 and 2, the transfer device 6 includes an impression cylinder 19 and a film transfer mechanism 20. The impression cylinder 19 receives the printed sheets 2 from a delivery cylinder 18 that is provided to receive the printed sheets 2 from the impression cylinder 4B. The film transfer mechanism 20 presses the transfer film 5 onto the printed sheets 2 on the impression cylinder 19 to perform transfer a pattern of the transfer film 5 thereon. The film transfer mechanism 20 is a mechanism that presses the transfer film 5 onto the printed sheets 2 to transfer gold foil, embossed patterns, hologram patterns, etc., from the transfer film 5 onto the printed sheets 2 while utilizing, as an adhesive agent, the ultraviolet curable resin varnish that has been applied at the varnish applicator section 4. Pressing the transfer film 5 onto the ultraviolet curable resin varnish over the printed sheets 2 enables the surfaces applied with the ultraviolet curable resin varnish to be smoothened and the surfaces to be made even glossier. Then, ultraviolet irradiating lamps 21 and 22 (one or more than two lamps may be provided) irradiate the pressed film 5 with ultraviolet rays from above to cure the ultraviolet curable resin varnish. The delivery cylinder 18 is also provided with grippers for gripping sheets 2 at two positions (one gripper may be provided at a single position or more than two grippers may be provided at more than two positions) in the circumferential direction, as with the above cylinders. The impression cylinder 19 is a so-called triple-diameter cylinder that has a larger diameter than the delivery cylinder 18 and is provided with grippers at three positions (not shown) in the circumferential direction, as with the above cylinders; therefore, the delivery cylinder 18 rotates 1.5 times while the impression cylinder 19 rotates a single time, whereby a sheet 2 can be passed to a gripper on the impression cylinder 19 from a gripper on the delivery cylinder 18 as described above. The impression cylinder 19 having a larger diameter (triple-diameter cylinder) than the other cylinders advantageously ensures a larger drying zone for the irradiation of ultraviolet rays as well as a longer distance from the varnish applicator section 4, but it is to be noted that the impression cylinder 19 may have the same diameter as the other cylinders.

In detailed description of the transfer device 6, as shown in FIGS. 1 and 2, the transfer device 6 includes a feed roll 13, two pressing rollers 15 and 16 (one or more than two may be provided), and a windup roll 17. The feed roll 13 is capable of winding up the transfer film 5 therearound and feeding out the same therefrom. The pressing rollers 15 and 16 are respectively disposed upstream and downstream in the circumferential direction of the impression cylinder 19 to press the transfer film 5 fed out from the feed roll 13 onto the printed sheets 2 on the impression cylinder 19. The windup roll 17 winds up the transfer film 5 therearound, which is peeled off from the printed sheets after being pressed by the pressing rollers 15 and 16. In FIG. 2, film guiding rollers R1 to R10 are disposed between the feed roll 13 and the upstream pressing roller 15. Film guiding rollers R13 to R16 are disposed between the downstream pressing roller 16 and the windup roll 17. The downstream pressing roller 16 is disposed at a position that is spaced upward from the impression cylinder 19 by a set distance for the reason that the film 5 can thereby be separated (peeled off) smoothly from the printed sheets 2; however, the pressing roller 16 may be disposed at a position enabling itself pressingly contact the impression cylinder 19.

The feed roll 13 is driven to rotate by the power of an electric motor M1 for the feed roll, and the windup roll 17 is driven to rotate by the power of an electric motor M2 for the windup roll. While a total of four electric motors, i.e., the two electric motors M1 and M2 and two electric motors 28 and 30 for drivingly rotating the rollers R9 and R5 for tension adjustment applied to the transfer film 5 are basically operated in synchronization with one another, the rotation speeds of the electric motors, which sometimes cause loosening or excessive tension in the transfer film 5, are controlled so as to favorably eliminate such loosening or excessive tension. Thus, the position of the transfer film 5 relative to the printed sheets 2 can be adjusted by performing this tension adjustment. The four electric motors M1, M2, 28 and 30 together constitute a film running mechanism that enables the transfer film 5 to run along any of a first film running path S1 and a second film running path S2, which will be hereinafter described.

A driving means is provided to allow the transfer section F to move close to or away from the impression cylinder 19, and, as shown in FIG. 2, this driving means is achieved by the structure that includes an air cylinder 31 having an extendable rod 31A with a teethed portion formed thereon, a gear 32 rotatably secured to the casing 6A of the transfer device 6 to be meshed with the teethed portion of the extendable rod 31A, a rack 33 having a teethed portion for conversion of the rotational force of the gear 32 rotated by the extension and retraction of the extendable rod 31A to a vertically moving force, in which a lower end of the rack 33 is connected substantially at the center in the printed sheet conveying direction of an upper end of a supporting member 34 with the pressing rollers 15, 16, etc., mounted thereto. With this arrangement, when surface treatment or transferring of patterns of the transfer film 5 is not performed or when the power is off after printing operation is stopped, the extendable rod 31A of the air cylinder 31 is extended to a position represented in chain double-dashed line of FIG. 2 to thereby rotate the gear 32 in a counterclockwise direction to move the rack 33 to an upper position represented in chain double-dashed line and move the support member 34 to an upper position, as well. Whereby, the transfer section F (the pressing rollers 15, 16 and the transfer film 5 wound between the pressing rollers 15, 16) can be moved away from the impression cylinder 19. When the transfer section F is to be moved downward, the extendable rod 31A of the sir cylinder 31 is retracted to a position represented in broken line of FIG. 2. Thus, the transfer section F (the pressing rollers 15, 16 and the transfer film 5 wound between the pressing rollers 15, 16) can be moved close to the impression cylinder 19 (cf. solid lines of FIG. 2). Herein, the description is made by taking, for example, the case where the transfer section F is moved in the vertical direction, while it is possible to modify the direction along which the transfer section F is moved close to and away from the cylinder 9 according to needs and circumstances. The structure shown in FIG. 2, in which the transfer section F positioned at the lower end of the transfer device 6 is moved away from the impression cylinder 19, produces an advantageous effect of reducing the size of the structure of moving the transfer section F away from the impression cylinder 19, while it is possible to employ the structure, in which t the transfer device 6 is entirely moved away from the impression cylinder 19.

As shown in FIG. 2, with the arrangement in which the transfer section F is moved close to or away from the impression cylinder 19, the first film running path S1 (represented in chain double-dashed line) causing the transfer film 5 to be positioned away from the impression cylinder 19, and the second film running path S2 (represented in solid line) causing the transfer film 5 to be positioned close to the impression cylinder 19 and having a running distance longer than the first film running path S1 are defined. A film running mechanism, which enables a transfer film 5 to run along both the running paths S1, S2, is constituted by the four electric motors M1, M2, 28 and 30, so that, by actuation of these four electric motors M1, M2, 28 and 30, the transfer film 5 can run in any of the upper position and the lower position of the transfer section F. Furthermore, as described later, when the transfer section F is to be moved from the lower position to the upper position, the driving of the four electric motors M1, M2, 28 and 30 is controlled to prevent loosening of the transfer film 5, and when the transfer section F is to be moved from the upper position to the lower position, the driving of the four electric motors M1, M2, 28 and 30 is controlled to prevent excessively high tension from being applied to the transfer film 5. The four electric motors M1, M2, 28 and 30 are driven in synchronization with each other until the transfer section F reaches the upper position at which the transfer section is brought out of a docking or interlocking engagement with the impression cylinder 19, and then they are stopped. By the docking or interlocking engagement is herein meant a state in which the transfer section F is held in contacting engagement with the impression cylinder 19.

Figure 3:
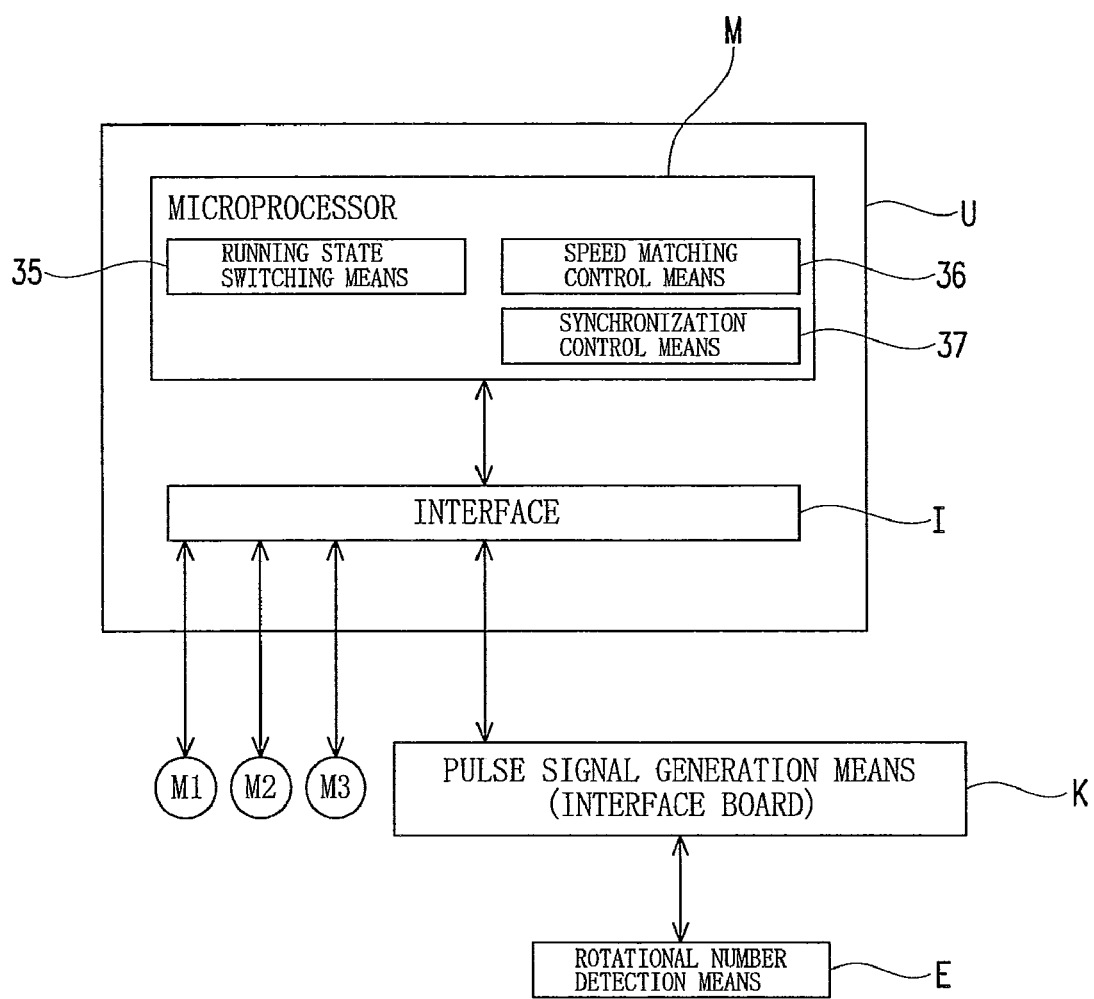
FIG. 3 is a block diagram of the present invention.

As shown in FIG. 3, the transfer device 6 is designed to be capable of controlling the running speed of the transfer film 5 by a control unit U.

That is, when the running speed of the transfer film 5 is matched to the rotational speed of the impression cylinder 19, the electric motors M1, M2 for driving the transfer device 6 and the electric motor M3 for driving the impression cylinder 19 run respectively at synchronized speeds by a pulse signal outputted from a rotational number detection means E. When the running speed of the transfer film 5 is not matched to the rotational speed of the impression cylinder 19, or more specifically when the transfer film 5 is held in running stopped state, the electric motors M1, M2 for driving the transfer device 6 cannot be driven by a pulse signal from the rotational number detection means E. In this case, a pulse signal is generated in pseudo manner (this signal is also called as a pseudo pulse signal) by a pulse signal generation means K, thereby starting the drive of the electric motors M1, M2 for driving the transfer device 6. When the running speed of the transfer film 5 is matched to the rotational speed of the impression cylinder 19, the transmission of a pulse signal from the pulse signal generation means K is stopped, and accordingly the operational mode is switched into a mode in which the electric motors M1, M2 for driving the transfer device 6 and the electric motor M3 for driving the impression cylinder 19 are driven with their speeds in synchronization with each other by a pulse signal outputted from the rotational number detection means E. The pulse signal generation means K is designed to generate a pulse signal for starting running of the transfer film 5 held in running stopped state, when the operation is made to switch the path of the transfer film 5 held in running stopped state relative to the impression cylinder 19 held in rotating state from the first film running path S1 to the second film running path S2 to allow the transfer film 5 to run in the docking or interlocking engagement with the impression cylinder 19 held in rotating state. This pulse signal generation means K is achieved by an interface board, etc.

In detailed description, a microprocessor M constituting the control unit U includes a running state switching means 35, a speed matching control means 36 and a synchronization control means 37. The running state switching means 35 is to bring the transfer film 5 into running stopped state in the first film running path S1, while the microprocessor constituting the control unit U keeps the impression cylinder 19 rotating at a constant speed. The speed matching control means 36 is to perform speed control by using a pulse signal generated at the pulse signal generation means K so as to match the running speed of the transfer film 5 to the rotational speed of the impression cylinder 19. The synchronization control means 37 is to control the rotational speed of the impression cylinder 19 and the film running speed of the transfer device 6 to be synchronized with each other based on a pulse signal from the impression cylinder 19 after both the speeds are matched to each other. A signal outputted from the microprocessor M is outputted to the rotational number detection means E via an interface I, and the pulse signal generation means K is connected between the rotational number detection means E and the interface I. The rotational number detection means E is constituted by a rotary encoder that outputs a pulse signal according to the rotation number of the impression cylinder 19, and this means may be a different type of sensor as long as it detects the rotational number.

Figure 4:
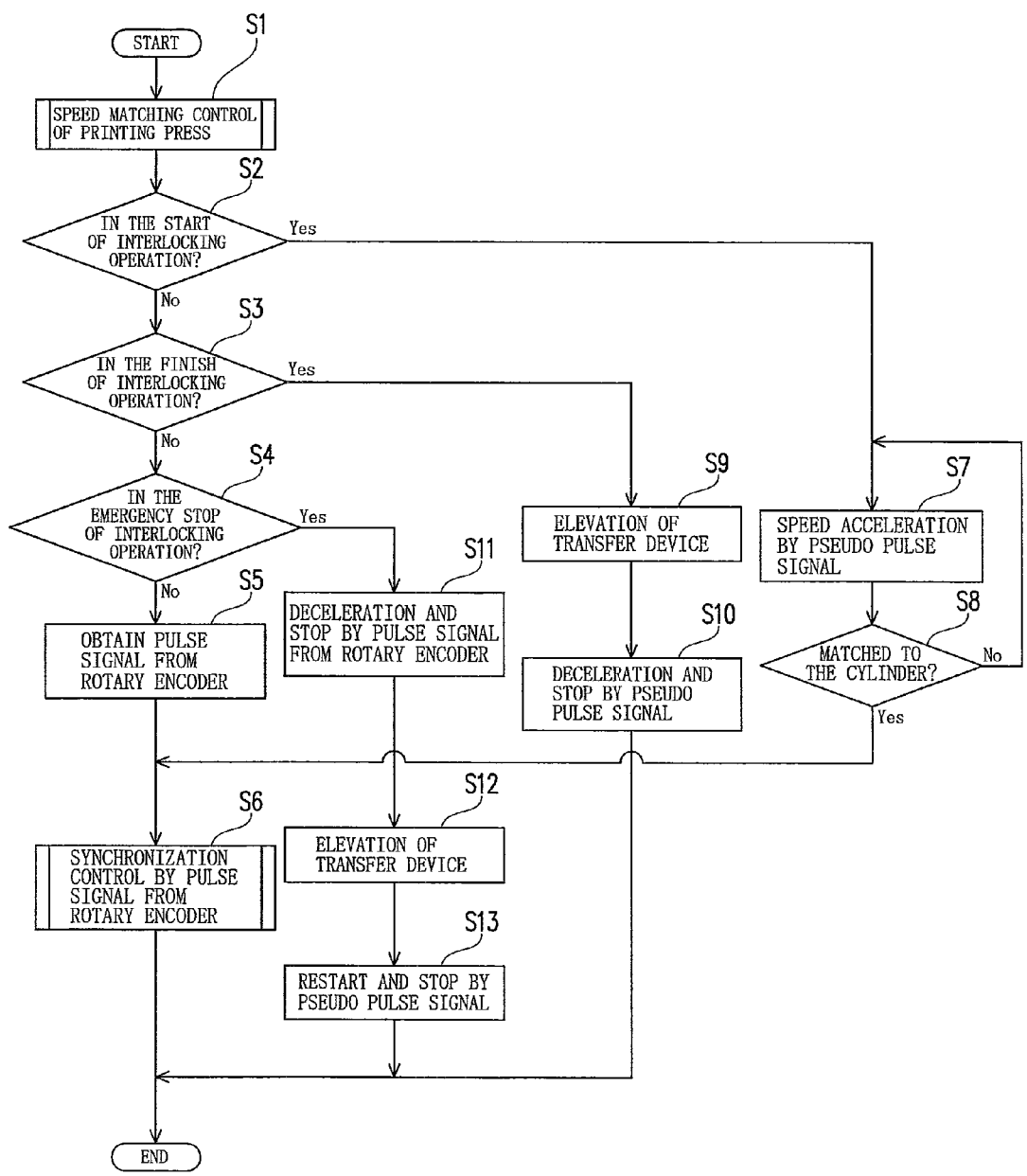
FIG. 4 is a flowchart showing the operation of a control unit.

The description will be made for speed matching control of the electric motors M1, M2 by the speed matching control means 36 and the subsequent synchronization control with reference to the flowchart of FIG. 4.

First, the microprocessor M enters into speed matching control for the printing press (Step S1); checks whether the printing press is in the start state of an interlocking operation or not (Step S2); checks whether the printing press is in the finish state of the interlocking operation or not, when not in the start state of the interlocking operation (Step S3); checks whether the printing press in the emergency stop state of the interlocking operation or not, when not in the finish state of the interlocking operation (Step S4); judges or determines the running speed of the transfer film 5 is matched to the rotational speed of the impression cylinder 19 when the printing press is not in the emergency stop of the interlocking operation, and accordingly obtains a pulse signal from the impression cylinder 19 (Step S5); and performs synchronization control with the speeds of the transfer device 6 and the impression cylinder 19 kept matched to each other, based on the obtained pulse signal (Step S6). That is, the drive of the electric motors M1, M2 is controlled so as to match the film running speed of the transfer device 6 to the conveying speed of the impression cylinder 19 based on the obtained pulse signal.

By the interlocking operation is herein meant an operational status, in which, with the impression cylinder 19 kept rotated at a constant speed, the transfer section is brought into docking or interlocking engagement with the impression cylinder 19 by driving the transfer device 6 held in running stopped state and thus both the transfer device 6 and the impression cylinder 19 are together kept driven. By the finish of the interlocking operation is herein meant stopping of running of the transfer device 6 by moving the transfer device 6 away from the impression cylinder 19, when printing operation is finished or only printing operation is performed. By the emergency stop of the interlocking operation is herein meant synchronously stopping the impression cylinder 19 and the transfer device 6 when the printing press is emergency stopped manually or automatically at the time of occurrence of troubles.

When the microprocessor M judges or determines that the printing press is in the start state of the interlocking operation in the Step S2, it drives the electric motors M1, M2 by a pulse signal (a pseudo pulse signal) generated at the interface board K, thereby accelerating the speed of the transfer device 6 (Step S7). After the acceleration of the transfer device 6, when the microprocessor M confirms that the rotational speed of the impression cylinder 19 has been matched to the running speed of the transfer device 6 (Step S8); the microprocessor M performs synchronization control with the speeds of transfer device 6 and the impression cylinder 19 kept matched to each other, based on a pulse signal obtained from a rotary encoder (the rotational number detection means) (Step S6).

When the microprocessor M judges or determines that the printing press in the finish state of the interlocking operation in the Step S3, it elevates the transfer device 6 (Step S9). After the elevation, the microprocessor M decelerates and stops the running of transfer film 5 of the transfer device 6 by a pulse signal from the interface board K (Step S10). The running of the transfer film 5 may be decelerated during the elevation of the transfer device 6.

When the microprocessor M judges or determines that the printing press is in the emergency stop state of the interlocking operation in the Step S4, it decelerates and stops the running of the transfer film 5 of the transfer device 6 in synchronization with the deceleration of the impression cylinder 19 by a pulse signal from the rotary encoder (the rotational number detection means E) (Step S11). After the stop, the transfer device 6 is elevated (Step S12). With this elevation, the running path of the transfer film 5 is shortened, and therefore the transfer film 5 may be loosened when the running of the transfer film 5 is stopped. For absorbing this, the running of the transfer film 5 of the transfer device 6 is restarted by a pulse signal from the interface board K, and the running of the transfer film 5 is stopped after elapse of a predetermined time (Step S13). The running of the transfer film 5 of the transfer device 6 may be restarted at a given time in a course of elevation of the transfer device 6.

The present invention is not necessarily limited to the above embodiment, and may be subjected to various modifications within the intended scope of the present invention.

For example, in the above embodiment, the interface board K is provided between the interface I and the rotary encoder (the rotational number detection means E), but may be provided at a different place to be connected to the interface I.

In the above embodiment, the transfer device 6 is of the type that the transfer film 5 on one roll is unwound and wound up on another roll, but may be of an endless type that an endless transfer film is wound up on plural rolls.

This specification is by no means intended to restrict the present invention to the preferred embodiments set forth therein. Various modifications to the speed control method and the speed control apparatus for the transfer device, as described herein, may be made by those skilled in the art without departing from the spirit and scope of the present invention as defined in the appended claims.

What is claimed is:

1. A speed control method for controlling film running speed of a transfer device that includes a film running mechanism that enables a transfer film to run along both a first film running path causing the transfer film to be positioned away from a cylinder and a second film running path causing the transfer film to be positioned close to the cylinder, and a transfer section that presses the transfer film onto a printed sheet of paper transferred by the cylinder to transfer a pattern of the transfer film onto the printed sheet of paper while the film running mechanism keeps the transfer film running along the second film running path, the method comprising:

holding the transfer film in running stopped state relative to the cylinder held in rotating state when the transfer film is located at the first film running path;

generating a pseudo pulse signal which is not based on a pulse signal outputted according to a rotational number of the cylinder;

starting the drive of the transfer device based on the pseudo pulse signal different from a pulse signal outputted according to the rotational number of the cylinder, when the transfer film held in running stopped state is moved from the first film running path to the second film running path to run in a docking or interlocking engagement with the cylinder held in rotating state, and performing speed matching control to match the film miming speed of the transfer device to the rotational speed of the cylinder; and switching a control mode from the speed matching control into synchronization control that synchronizes the rotational speed of the cylinder with the film miming speed of the transfer device based on the pulse signal from the cylinder, after the matching of the speeds.

2. The speed control method for controlling film running speed of the transfer device according to claim 1, wherein the running of the transfer film is decelerated and stopped based on the pseudo pulse signal different from the pulse signal from the cylinder after or in the course of moving the transfer film from the second film miming path to the first film running path, when a signal representative of finish of the drive is outputted during the transfer film is kept running in the docking or interlocking engagement.

3. The speed control method for controlling film running speed of the transfer device according to claim 1, wherein the running distance of the second film miming path is set to be longer than the miming distance of the first film running path, the running of the transfer film is stopped while the running speed of the transfer film is kept in synchronization with the rotational speed of the cylinder, based on the pulse signal from the cylinder, when a signal representative of emergency stop is outputted during the transfer film is kept miming in the docking or interlocking engagement; and the running of the transfer film is restarted and kept for a predetermined period of time and then is stopped, based on the pseudo pulse signal different from the pulse signal from the cylinder after or in the course of moving the transfer film from the second film miming path to the first film running path after the stop of the running of the transfer film.

4. A speed control apparatus for controlling film running speed of a transfer device that includes a film running mechanism that enables a transfer film to run along both a first film miming path causing the transfer film to be positioned away from a cylinder and a second film running path causing the transfer film to be positioned close to the cylinder, and a transfer section that presses the transfer film onto a printed sheet of paper transferred by the cylinder to transfer a pattern of the transfer film onto the printed sheet of paper while the film running mechanism keeps the transfer film miming along the second film running path, the apparatus comprising:

- a microprocessor comprising at least a running state switching unit, a speed matching control unit, and a synchronization control unit;
- a rotational number detection means; and
- a pulse signal generation means,
- wherein the running state switching unit brings the transfer film into stopped state in the first film miming path, while rotating the cylinder at a constant speed;
- the rotational number detection means outputs a pulse signal according to the rotational number of the cylinder so as to control the rotational speed of the cylinder;
- the pulse signal generation means generates a pseudo pulse signal for starting running of the transfer film, which is not based on a pulse signal outputted according to a rotational number of the cylinder, the pseudo pulse signal being used to start running of the transfer film held in the miming stopped state relative to the cylinder held in the rotating state when the transfer film held in the running stopped state relative to the cylinder held in the rotating state is moved from the first film running path to the second film running path to run in a docking or interlocking engagement with the cylinder held in the rotating state;
- the speed matching control unit performs speed control by using the pseudo pulse signal generated by the pulse signal generation means so as to match the miming speed of the transfer film, which has been started to run, to the rotational speed of the cylinder; and
- the synchronization control unit performs synchronization control of the rotational speed of the cylinder and the film running speed of the transfer device based on the pulse signal from the cylinder, after both the speeds have been matched to each other.

* * * * *

UNITED STATES PATENT AND TRADEMARK OFFICE
CERTIFICATE OF CORRECTION

PATENT NO. : 8,246,769 B2  
APPLICATION NO. : 12/726632  
DATED : August 21, 2012  
INVENTOR(S) : Takahiko Nakamura et al.

It is certified that error appears in the above-identified patent and that said Letters Patent is hereby corrected as shown below:

Column 10, Line 39, Claim 1, delete "miming" and insert -- running --

Column 10, Line 44, Claim 1, delete "miming" and insert -- running --

Column 10, Line 52, Claim 2, delete "miming" and insert -- running --

Column 10, Line 58, Claim 3, delete "miming" and insert -- running --

Column 10, Line 59, Claim 3, delete "miming" and insert -- running --

Column 10, Line 64, Claim 3, delete "miming" and insert -- running --

Column 11, Lines 2-3, Claim 3, delete "miming" and insert -- running --

Column 11, Line 8, Claim 4, delete "miming" and insert -- running --

Column 11, Line 14, Claim 4, delete "miming" and insert -- running --

Column 11, Line 21, Claim 4, delete "miming" and insert -- running --

Column 12, Line 6, Claim 4, delete "miming" and insert -- running --

Column 12, Line 15, Claim 4, delete "miming" and insert -- running --

Signed and Sealed this  
Thirteenth Day of November, 2012

David J. Kappos  
*Director of the United States Patent and Trademark Office*